July 14, 1959 T. A. BILLINGS 2,894,544
TREE AND BRUSH CUTTING ATTACHMENT FOR BULLDOZERS
Filed Oct. 11, 1957 2 Sheets-Sheet 1
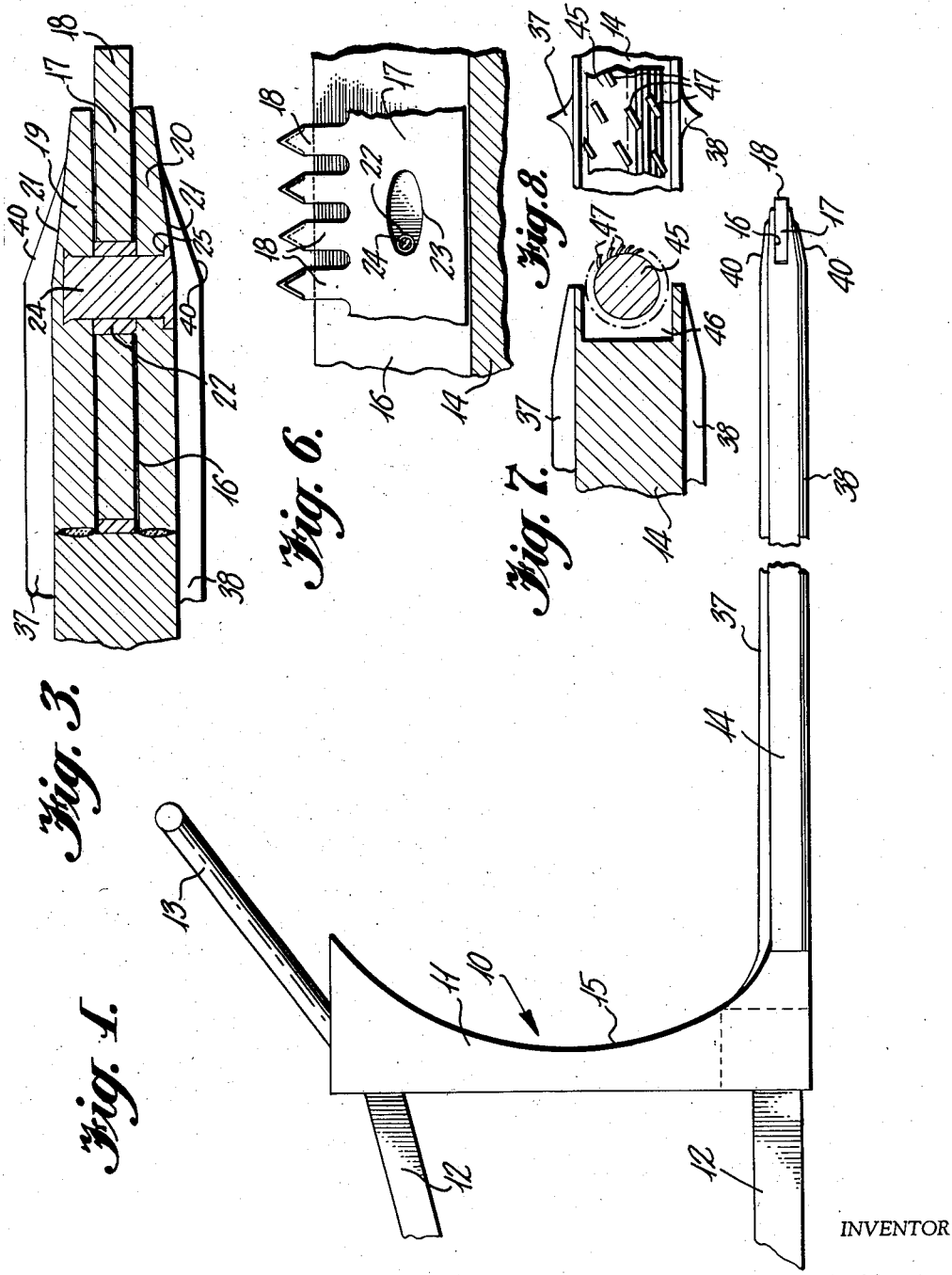
INVENTOR
*Thomas A. Billings*
BY *Mason, Fenwick & Lawrence*
ATTORNEYS July 14, 1959 T. A. BILLINGS 2,894,544
TREE AND BRUSH CUTTING ATTACHMENT FOR BULLDOZERS
Filed Oct. 11, 1957 2 Sheets-Sheet 2
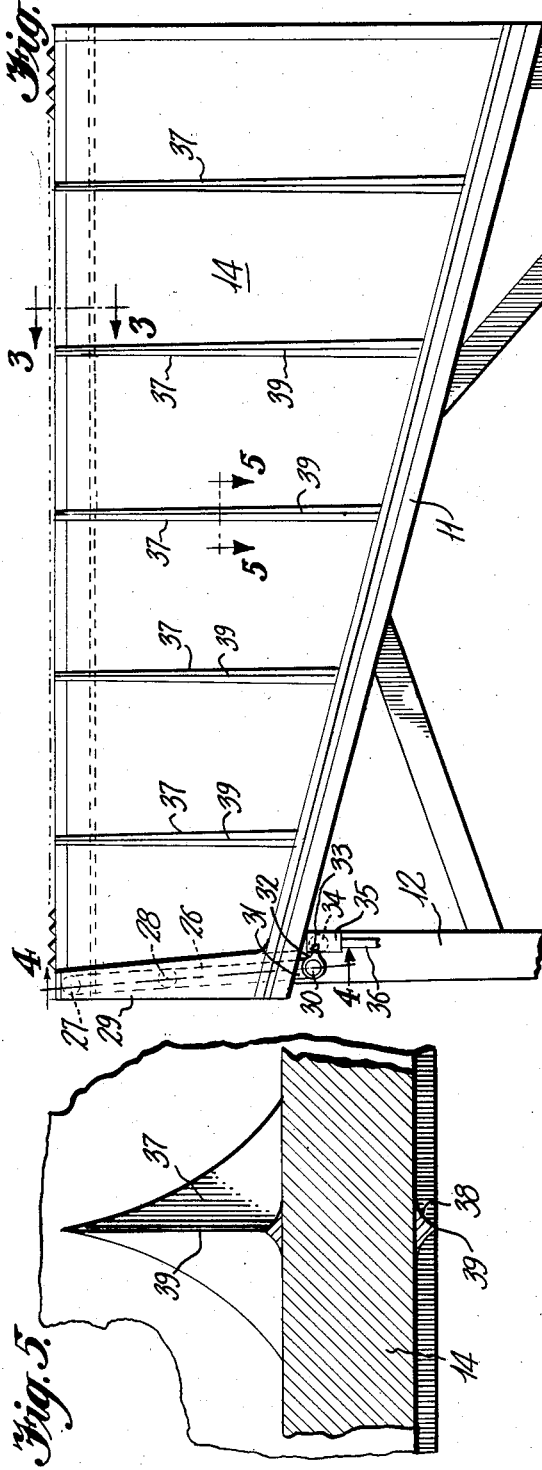
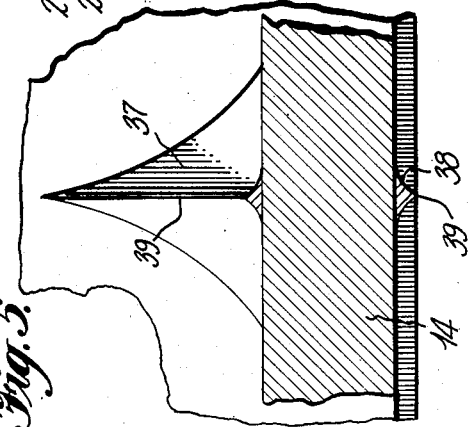
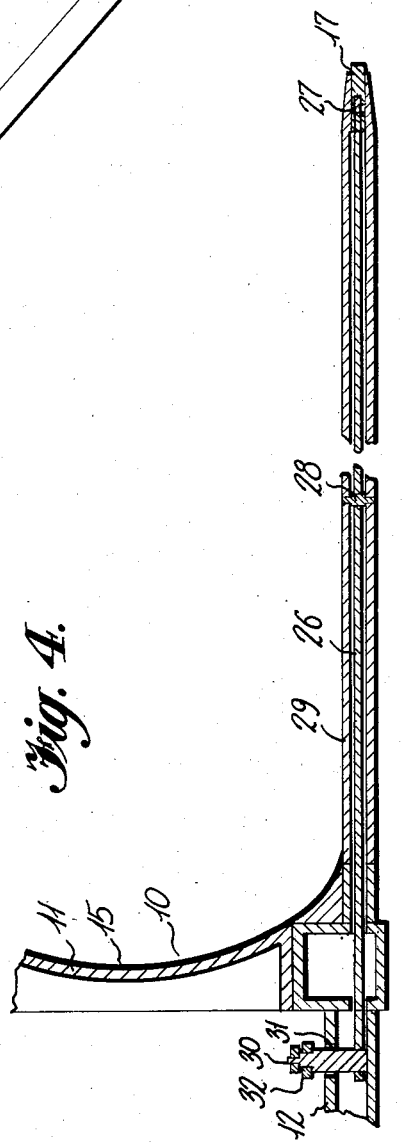
INVENTOR
Thomas A. Billings
BY Mason, Fenwick & Lawrence
ATTORNEYS United States Patent Office
2,894,544
Patented July 14, 1959

2,894,544

TREE AND BRUSH CUTTING ATTACHMENT FOR BULLDOZERS

Thomas A. Billings, Orlando, Fla.

Application October 11, 1957, Serial No. 689,595

3 Claims. (Cl. 144—34)

The present invention relates in general to land clearing implements, and more particularly to a clearing saw and moldboard or pusher blade assembly for use on tractors or other motivating vehicles in land clearing operations.

There are many pieces of equipment now on the market for uprooting trees and clearing underbrush and other debris above ground level. Bulldozers, scrapers and pusher blade and tree-knockdown boom attachments have been provided for these purposes. Such equipment, however, either uproots the trees and brush when the blade is set above ground level, leaving substantially all the low level growth, or the blade must be set to cut below ground level in which case large quantities of earth are moved along with the ground cover, alternating the grade and consuming much time and fuel.

An object of the present invention is the provision of a novel land clearing implement for attachment to motivating vehicles which facilitates mass clearing of forest growth to ground level.

Another object of the present invention is the provision of a novel land clearing implement for attachment to a motivating vehicle, which will completely clear, with each forward pass of the vehicle, a path corresponding to the width of the implement wherein the ground is cleared of all forest growth.

Another object of the present invention is the provision of a novel land clearing implement having a pusher blade and power driven saw teeth projecting forwardly from the lower edge of the blade to completely cut all trees, brush and growth at ground level and distribute the growth laterally of the path traversed by the blade.

Other objects, advantages and capabilities of the present invention will become apparent from the following detailed description, taken in conjunction with the accompanying drawings illustrating a preferred form of the invention.

In the drawings:

Figure 1 is a side elevation of a power clearing saw embodying the present invention;

Figure 2 is a plan view of the clearing saw;

Figure 3 (Sheet 1) is a vertical section view taken along the line 3—3 of Figure 2;

Figure 4 is a vertical section view taken along the line 4—4 of Figure 2;

Figure 5 is a vertical section view taken along the line 5—5 of Figure 2;

Figure 6 (Sheet 1) is a fragmentary sectional detail of a form of saw blade employed in the present invention; and Figures 7 and 8 are a fragmentary transverse section view and front elevation, respectively, of a modified form of the present invention.

Referring to the drawings, wherein like reference characters designate corresponding parts throughout the several figures, and particularly to the embodiment shown in Figures 1–6, the clearing saw unit, indicated generally by the reference character 10, includes the usual pusher blade or moldboard 11 of the type employed on bulldozers, tractors, or other motivating vehicles, which is supported on the push arms, indicated at 12, projecting forwardly of the vehicle. A tree bumper or boom 13 of conventional construction is rigidly carried by the blade 11 and projects forwardly and upwardly therefrom to protect the operator from trees falling in the direction of the vehicle.

A large plate 14 which is of truncated triangular shape in the preferred embodiment herein shown, is welded or otherwise fixed at the lower edge of the concave face 15 and projects forwardly of the blade 11 in a substantially horizontal plane. The plate 14 extends the full width of the blade 11 and has formed at its forward edge a guide groove 16 extending the entire length of the forward edge in which an elongated, flat saw blade 17 having forwardly projecting teeth 18 is supported for rectilinear reciprocative movement. The groove 16 may be formed by milling it in the forward edge of the plate 14 or by milling the groove 16 in a separate plate which is welded onto the edge of the plate 14. However, the groove 16 is preferably formed, as illustrated in the accompanying drawings, by welding two coextensive abrasion-resistant steel strips 19, 20, in vertically spaced, parallel relation to the forward edge of the plate 14, to project in parallel horizontal planes from the plate 14 and define the groove 16 therebetween. The strips 19, 20 are beveled along their forward edges as indicated at 21 to provide forwardly converging or wedge-shaped surfaces at the leading edge of the implement. The saw blade 17 is held in place in the groove 16 by a plurality of spacer sleeves 22 seated in guide slots 23 formed at spaced intervals in the saw blade 17. The spacer sleeves 22 extend between the upper and lower surfaces of the groove 16 and are supported on hardened steel bolts 24 inserted into countersunk bolt holes 25 in the strips 19, 20. By forming the groove 16 between the two spaced strips 19, 20 welded to the forward edge of the plate 14, the more complex milling operation is avoided.

The saw blade 17 is driven from one end thereof to reciprocate it in the guide groove 16 by a rock lever 26 pivotally coupled by a pin and slot connection indicated at 27 to the saw blade 17 and pivoted intermediate its ends at 28 to a hollow frame member or housing member 29 fixed to the shorter edge of the plate 14. The other end of the lever 26 extends rearwardly of the pusher blades 11 into one of the hollow push arms 12, and has an upwardly projecting stub shaft 30 fixed thereto which projects through a slot 31 in the push arm 12 and is coupled by link 32 with an eccentric pin 33 on a wheel 34. The link 32 has a rotatable connection with both the stub shaft 30 and the eccentric pin 33. The wheel 34 is driven through a gear box 35 from a drive shaft 36 which may be driven by any suitable power source such as a gasoline, electric or hydraulic motor or the drive may be derived from the motivating vehicle.

The wedge-shaped formation produced at the leading edge of the saw produced by the beveled edges 21 assists in opening the cut made in a tree by the saw blade 17 as the motivating vehicle is driven forward. Additionally, a number of reinforcing bars 37, 38 of wedge-shaped cross-section as illustrated in Figure 5 are welded to the upper and lower surfaces, respectively, of the plate 14 in parallel, laterally spaced relation projecting forwardly from the pusher blade 11 in parallelism with the longitudinal axes of the push arms 12 and of the motivating vehicle. The bases of the bars 37, 38 are welded to the plate 14 so that the apices of the bars form sharp edges 39 projecting away from the plate. These reinforcing bars 37, 38 are beveled at their forward edges as indicated at 40 to converge toward the saw blade 17 and beveled surfaces 22 of the strips 19, 20 and the upper bars 37 increase gradually in height as they progress rearwardly from the beveled edges 40. The bars 37, 38 not only serve to reinforce the plate 14, but, due to the sharp elongated edges 39, assist in holding the saw unit in line with its forward motion and help wedge open the cuts formed by the saw blade and split the large size trees.

The clearing saw unit 10 may be conveniently mounted on rubber-tired or crawler type tractors. As it is a powered-type saw, it does not depend on strenuous force of the tractor to do the cutting. Thus a much smaller tractor can do the work which now requires a large, heavy tractor provided with conventional cutting, tree felling or uprootting devices. When the tractor with the clearing saw unit 10 is driven through the underbrush and against trees, all of the forest growth is cut at the height at which the saw blade 17 and supporting plate 14 are held above the ground by the push arms 12. The rotating wheel 34 driven through the gear box 35 oscillates the stub shaft 30 and associated end of the rock lever 26 back and forth in the slot 31, by virtue of the eccentric connection of the link 32 with the pin 33 on the wheel 34, causing the saw blade 17 to be reciprocated back and forth along its longitudinal axis and parallel to the lower edge of the pusher blade 11 through the pin and slot connection 27. The saw blade 17 is prevented from becoming jammed in large trees by the action of the beveled edges 22 of the strips 19, 20 and the wedge effect of the reinforcing bars 37, 38 which tends to spread the cut as the saw blade proceeds through the tree trunk. Additionally, the sharp edges 39 of the bars 37, 38 bite into the wood surfaces bounding the cut and resist lateral displacement of the plate 14. As the trees and debris are cut, they will slide rearwardly against the blade or moldboard 11. As shown in Figure 2, the blade 11 is set at an angle to the direction of travel of the vehicle so that all trees and debris will slide along the blade 11 to the right as viewed in Figure 2 and be discharged laterally from the right-hand end of the unit 10, as the tractor is driven forward. The tree bumper or boom 13 projects forwardly and upwardly from the blade 11 to prevent large trees from falling backward onto the operator or the tractor.

It will be understood that the shape and extent of forward projection of the plate 14 may be altered, as by extending the leading edge of the plate 14 in parallelism with the rear edge thereof, or by welding the strips 19, 20 directly onto the lower edge of a pusher blade. In the latter instance, the rock lever 26 would project farther into the push arm 12 and its intermediate pivot 28 would be located rearwardly of the blade 11. A wing type arrangement of such units may be employed, wherein a saw unit of the type described may be mounted on each of a pair of angularly related pusher blades diverging symmetrically from a sharp wedge type point in front of and centered on the motivating vehicle.

Additionally, different specific saw constructions may be employed in the clearing saw unit. For example, a cylindrical saw of the type shown in Figures 7 and 8 may be provided having an elongated cylinder 45 rotatably mounted in a well 46 at the leading edge of the plate 14 extending the full width of the plate 14 and having a large number of cutting teeth 47 of hook shaped configuration fixed in staggered relation on the cylinder 45. Such a rotary saw cylinder may be driven from an auxiliary motor or the motivating vehicle by any suitable means such as a gear drive, a chain and sprocket drive, or the like. Slight enlargement of the thickness of the plate 14 may be required depending on the diameter of the rotary saw cylinder, to permit strips similar to the beveled edge strips 19, 20 and reinforcing bars 37, 38 to be associated with the plate 14 to spread the cut.

It will be understood that the disclosure represents exemplary embodiments of the invention, and that other arrangements of parts cooperable to carry out the inventive concept within the scope of those skilled in the art are to be regarded as within the purview of the invention.

What is claimed is:

1. A saw unit for clearing forest growth and the like comprising a bulldozer blade adapted to be mounted forwardly of a tractor, a saw supporting member secured to the lower edge of said bulldozer blade and projecting forwardly therefrom in a substantially horizontal plane, toothed saw means movably supported on said supporting member at the forward edge thereof extending substantially the full width of said bulldozer blade, driving means for said saw member for moving the teeth thereof relative to said supporting member and said bulldozer blade, and a plurality of elongated means on said supporting member projecting in rising and depending relation from said supporting member forming oppositely directed guide edges lying in parallelism with the longitudinal axis of the tractor extending from said bulldozer blade substantially to said saw means for biting into the cut bounding surfaces of objects being cut for resisting lateral displacement of the saw unit from a selected axis of movement paralleling said longitudinal axis, and for progressively spreading the surfaces of a cut made by said saw means as the saw means advances through objects being cut.

2. A brush and tree cutting attachment for tractors comprising a bulldozer blade adapted for mounting forwardly of a tractor at an angle relative to the longitudinal axis thereof, a plate secured to the lower edge of said blade projecting forwardly therefrom and extending substantially the width of said blade, said plate having a forwardly opening groove along the forward edge thereof, an elongated saw blade corresponding substantially to the width of said plate slidably supported in said groove and having teeth projecting forwardly of the plate, drive means for reciprocating said saw blade longitudinally in said groove, said plate having inclined surfaces at said forward edge diverging rearwardly of said plate, and a plurality of laterally spaced elongated rib members projecting perpendicularly from the upper and lower surfaces of said plate and extending substantially from said blade to the forward edge of said plate, said rib members having sharp cutting edges extending the length thereof forming forwardly converging pairs of upper and lower cutting edges, whereby said rib members bite into the wood bounding a cut formed by the saw blade to guide the attachment along an axis paralleling the longitudinal axis of the tractor and wedge open the cuts formed by the saw blade.

3. A brush and tree cutting implement for tractors comprising a bulldozer blade adapted for mounting forwardly of a tractor at an angle relative to the longitudinal axis thereof, a plate secured to the lower edge of said blade projecting forwardly therefrom along a substantially horizontal plane and extending substantially the width of said blade, said plate having a forwardly opening, substantially horizontal groove in the forward edge thereof extending substantially the width of the plate, a flat, elongated saw blade slidably seated in said groove and extending substantially the width of said plate, said saw blade having a toothed edge projecting forwardly of the plate, said plate having oppositely inclined surfaces extending along the forward edge thereof diverging rearwardly of said forward edge forming a generally wedge-shaped leading edge, drive means for reciprocating said saw blade along its longitudinal axis in said groove, and elongated reinforcing rib members of substantially triangular cross section extending in laterally spaced parallelism along the upper and lower surfaces of said plate substantially from the rear to the forward edges thereof, said rib members being aligned with the longitudinal axis of the tractor and having elongated sharp edges directed away from said plate and extending in parallelism with said longitudinal axis, and the height of the sharp edges of the rib members on at least one of the surfaces of said plate progressively increasing toward the rear of said plate, and said rib members having beveled forward edges adjacent the toothed edge of the saw blade, said rib members serving to wedge open the cuts formed by the saw blade and the elongated edges thereof acting to bite into the wood bounding the cuts for directing the movement of the implement along an axis of movement paralleling said longitudinal axis and resisting lateral displacement of the implement from said axis of movement.

References Cited in the file of this patent

UNITED STATES PATENTS

| | | |
|---|---|---|
| 1,263,385 | Delas | Apr. 23, 1918 |
| 1,644,961 | Suttis et al. | Oct. 11, 1927 |
| 2,578,097 | Soss | Dec. 11, 1951 |
| 2,615,262 | Reid | Oct. 28, 1952 |
| 2,633,164 | Kissner et al. | Mar. 31, 1953 |
| 2,648,358 | Lower | Aug. 11, 1953 |
| 2,670,768 | Yohn | Mar. 2, 1954 |
| 2,701,591 | Kissner et al. | Feb. 8, 1955 |
| 2,711,623 | Horan | June 28, 1955 |